United States Patent
Chen et al.

(10) Patent No.: US 12,483,115 B2
(45) Date of Patent: Nov. 25, 2025

(54) TIMING CONTROLLER FOR POWER CONVERTER

(71) Applicant: NOVATEK Microelectronics Corp., Hsinchu (TW)

(72) Inventors: Ching-Jan Chen, Taipei (TW); Chieh-Ju Tsai, Kinmen County (TW); Ching-Yang Wu, Kaohsiung (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 251 days.

(21) Appl. No.: 18/447,316

(22) Filed: Aug. 10, 2023

(65) Prior Publication Data

US 2024/0313632 A1    Sep. 19, 2024

Related U.S. Application Data

(60) Provisional application No. 63/490,003, filed on Mar. 14, 2023.

(51) Int. Cl.
*H02M 1/08* (2006.01)
*H02M 3/157* (2006.01)

(52) U.S. Cl.
CPC ............ *H02M 1/08* (2013.01); *H02M 3/157* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225;
(Continued)

(56) References Cited

U.S. PATENT DOCUMENTS 8,193,790 B2 * 6/2012 Asuncion .............. H02M 3/156 323/284
9,912,237 B2 * 3/2018 Kawano ................ H02M 3/156
(Continued)

FOREIGN PATENT DOCUMENTS

CN 103280971 A 9/2013
CN 104167904 A 11/2014
(Continued)

*Primary Examiner* — Jeffrey A Gblende
(74) *Attorney, Agent, or Firm* — CKC & Partners Co., LLC

(57) ABSTRACT

A power converter includes a power stage, a feedback circuit, a ramp generator and a controller. The power stage generates a pulse width modulation signal for forming an output voltage. The controller includes a comparator, a control logic circuit, an on-time generator and an off-time generator. The comparator generates a comparison signal according to a compensation signal from the feedback circuit and a ramp signal from the ramp generator. The control logic circuit generates a first trigger signal according to the comparison signal and an off-time pulse signal. The on-time generator generates a duty signal according to the first trigger signal. The duty signal is transmitted to the power stage for controlling a duty cycle ratio of the pulse width modulation signal. The off-time generator generates the off-time pulse signal according to the duty signal and transmits the off-time pulse signal to the control logic circuit.

18 Claims, 8 Drawing Sheets

(58) Field of Classification Search
CPC .......... G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 11,728,722 B2 * | 8/2023 | Sun | H02M 5/293 363/13 |
| 12,294,298 B2 * | 5/2025 | Wang | H02M 3/158 |

FOREIGN PATENT DOCUMENTS

| | | | | |
|---|---|---|---|---|
| CN | 110504834 A | | 11/2019 | |
| CN | 115514228 A | * | 12/2022 | ............ H02M 1/088 |
| TW | 202101879 A | | 1/2021 | |

* cited by examiner

TIMING CONTROLLER FOR POWER CONVERTER

RELATED APPLICATIONS

This application claims priority to U.S. Provisional Application Ser. No. 63/490,003, filed Mar. 14, 2023, which is herein incorporated by reference.

BACKGROUND

Technical Field

The present disclosure relates to a power converter. More particularly, the present disclosure relates to a timing controller for controlling a power stage of the power converter.

Description of Related Art

With development of technology, various power converters have been applied to various circuitries. Among related approaches, a ramp power converter, a type of switch-mode power supply, uses a ramp generator in its control system. The ramp generator creates a repeating linear voltage signal, which, when compared with an error signal, helps produce a pulse-width modulation (PWM) control signal. The ramp signal controls the switching frequency and duty cycle of the power converter, influencing its output voltage and stability. Ramp-based power converters are crucial in many electronic devices, and their design requires careful handling of control strategies to ensure accurate voltage output and stability over varying loads and operating conditions.

SUMMARY

Some aspects of the present disclosure are to provide a power converter. The power converter includes a power stage, a feedback circuit, a ramp generator and a controller. The power stage is configured to generate a pulse width modulation signal for forming an output voltage. The feedback circuit is configured to generate a compensation signal according to the output voltage. The ramp generator is configured to generate a ramp signal. The controller is coupled with the feedback circuit and the ramp generator. The controller includes a comparator, a control logic circuit, an on-time generator and an off-time generator. The comparator is configured to generate a comparison signal according to the compensation signal and the ramp signal. The control logic circuit is coupled with the comparator. The control logic circuit is configured to generate a first trigger signal according to the comparison signal and an off-time pulse signal. The on-time generator is coupled with the control logic circuit. The on-time generator is configured to generate an on-time pulse signal and a duty signal according to the first trigger signal. The duty signal is transmitted to the power stage for controlling a duty cycle ratio of the pulse width modulation signal. The off-time generator is configured to generate the off-time pulse signal according to the duty signal and transmit the off-time pulse signal to the control logic circuit.

Some aspects of the present disclosure are to provide a power converter. The power converter includes a power stage, a feedback circuit, a ramp generator and a controller. The power stage is configured to generate a pulse width modulation signal for forming an output voltage. The feedback circuit is configured to generate a compensation signal according to the output voltage. The ramp generator is configured to generate a ramp signal. The controller is coupled with the feedback circuit and the ramp generator. The controller includes a comparator, a control logic circuit and a combined time generator. The comparator is configured to generate a comparison signal according to the compensation signal and the ramp signal. The control logic circuit is coupled with the comparator. The control logic circuit is configured to generate a first trigger signal according to the comparison signal and an off-time pulse signal. The combined time generator is coupled with the control logic circuit. The combined time generator is configured to generate a duty signal according to the first trigger signal and generate the off-time pulse signal according to the duty signal. The duty signal generated by the combined time generator is transmitted to the power stage for controlling a duty cycle ratio of the pulse width modulation signal, and the off-time pulse signal generated by the combined time generator is transmitted to the control logic circuit.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
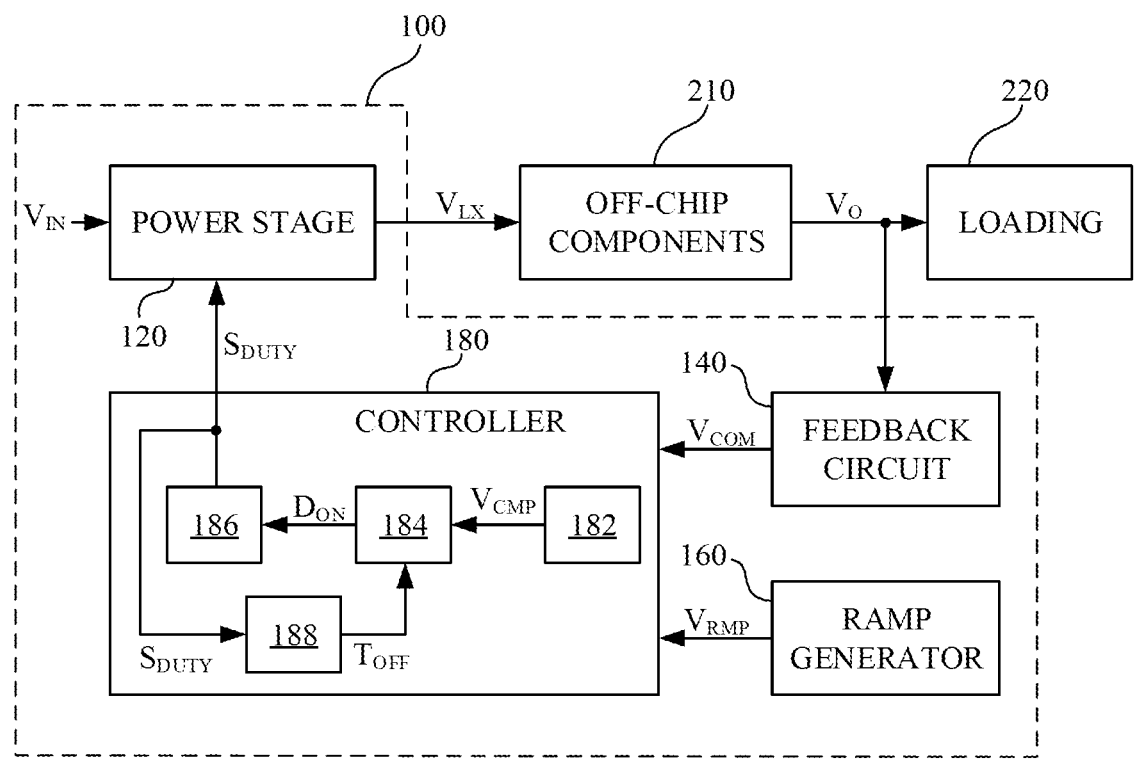
FIG. 1 is a schematic diagram illustrating a power converter according to some embodiments of the present disclosure.

Reference is made to FIG. 1. FIG. 1 is a schematic diagram illustrating a power converter 100 according to some embodiments of the present disclosure.

As illustrated in FIG. 1, the power converter 100 includes a power stage 120, a feedback circuit 140, a ramp generator 160 and a controller 180. The power stage 120 is coupled to the controller 180 and some off-chip components 210.

The power stage 120 is configured to generate a pulse width modulation (PWM) signal $V_{LX}$ according to an input voltage $V_{IN}$ and a duty signal $S_{DUTY}$. The pulse width modulation signal $V_{LX}$ is provided by the power stage 120 to the off-chip components 210 for forming an output voltage $V_O$ on the off-chip components 210. The output voltage $V_O$ is transmitted to a loading 220 for driving the loading 220. In some embodiments, the loading 220 can be a battery, a processor or any equivalent power consuming load.

Figure 2:
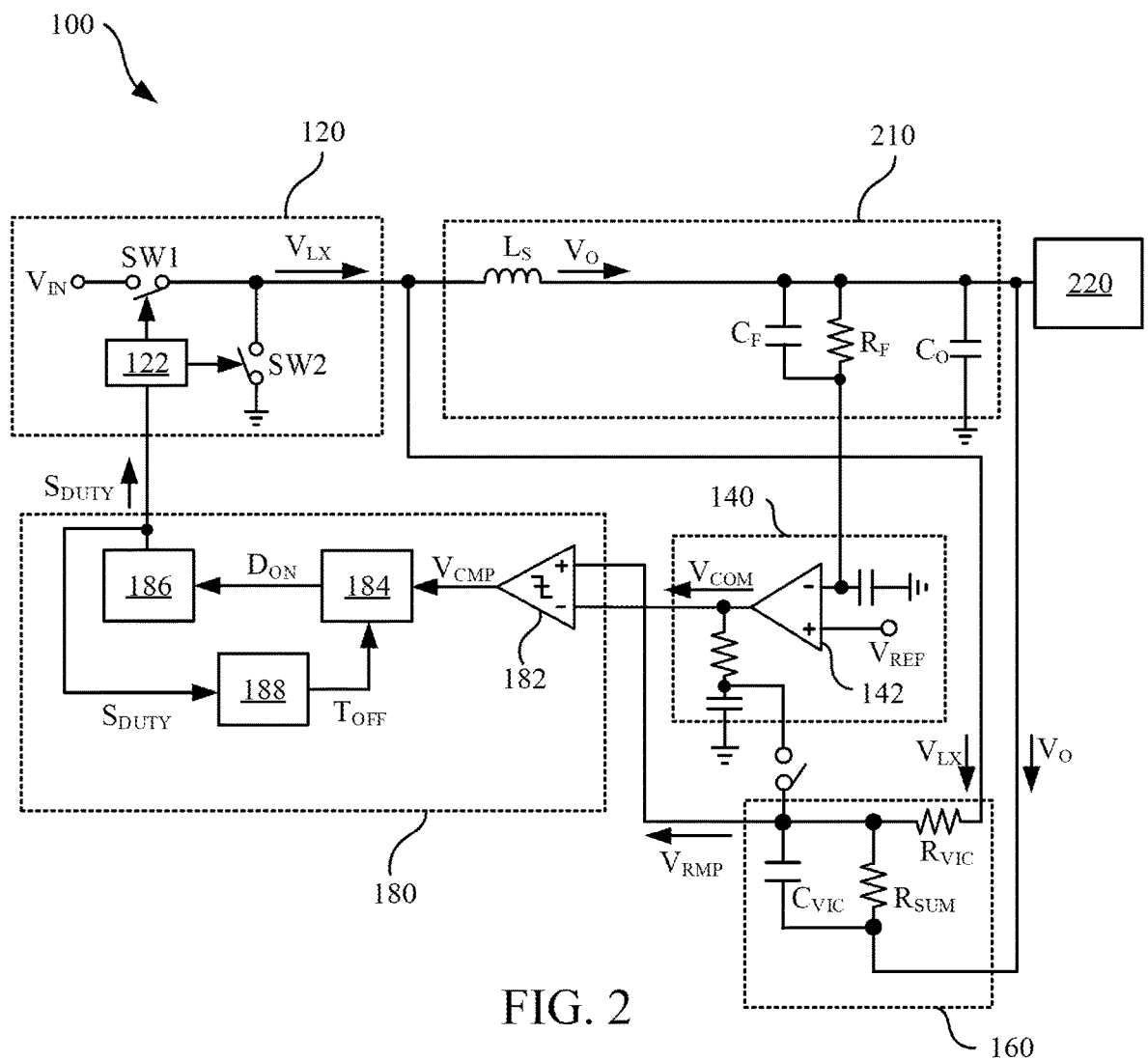
FIG. 2 is a schematic diagram illustrating internal structures of the power stage, the feedback circuit, the ramp generator and the controller in the power converter according to some embodiments.

Reference is further made to FIG. 2, which is a schematic diagram illustrating internal structures of the power stage 120, the feedback circuit 140, the ramp generator 160 and the controller 180 in the power converter 100 according to some embodiments. In some embodiments, the off-chip components 210 may include at least one passive component (s), such as an inductor $L_S$, two capacitors $C_F$ and $C_O$ and a resistor $R_F$. The capacitor $C_O$ may induce a parasitic resistance on the capacitor $C_O$. Based on the pulse width modulation signal $V_{LX}$, the off-chip components 210 induces the output voltage $V_O$. In some embodiments, the output voltage $V_O$ is a direct-current (DC) voltage.

As illustrated in FIG. 2, the power stage 120 includes a switch SW1, a switch SW2 and a driver 122. In some embodiments, the driver 122 is configured to control the switches SW1 and SW2. The driver 122 receives the duty signal $S_{DUTY}$ and is configured to turn on or turn off the switch SW1 and SW2 according to the duty signal $S_{DUTY}$. When the switch SW1 is turned on and the switch SW2 is turned off, the pulse width modulation signal $V_{LX}$ is generated in response to the input signal $V_{IN}$. When the switch SW1 is turned off and the switch SW2 is turned on, the pulse width modulation signal $V_{LX}$ is generated in response to a ground voltage. In another mode, the switch SW1 and the switch SW2 can be both turned off.

As shown in FIG. 1 and FIG. 2, the feedback circuit 140 is coupled with the off-chip components 210 and is configured to generate a compensation signal $V_{COM}$ according to the output voltage $V_O$. Ideally, the power converter 100 is configured to provide the output voltage $V_O$ at a desired voltage level (e.g., 1.5V, 3V or 5V depending a voltage required by the loading 220). In practical applications, when the loading 220 varies (e.g., from a heavy loading to a light loading, or from a light loading to a heavy loading), an actual voltage level of the output voltage $V_O$ in a transient scheme may drop below the desired voltage level and gradually resume to the desired voltage level. In some embodiments, the feedback circuit 140 is configured to compare the actual voltage level of the output voltage $V_O$ with a reference signal $V_{REF}$ (fixed at the desired voltage level), and generate a compensation signal $V_{COM}$ according to a difference between the output voltage $V_O$ and the reference signal $V_{REF}$. The compensation signal $V_{COM}$ is also regarded as an error signal indicating the difference between the output voltage $V_O$ and the desired voltage level.

As shown in embodiments in FIG. 2, the feedback circuit 140 includes an error amplifier 142. A first input terminal (e.g., a positive input terminal) of the error amplifier 142 receives the reference signal $V_{REF}$. The output voltage $V_O$ is sampled by the capacitor $C_F$ and the resistor $R_F$ and transmitted to a second input terminal (e.g., a negative input terminal) of the error amplifier 142. The error amplifier 142 compares the reference signal $V_{REF}$ with the sampled output voltage $V_O$ and correspondingly generates the compensation signal $V_{COM}$.

As shown in FIG. 1, the ramp generator 160 is configured to generate a ramp signal $V_{RMP}$. As shown in embodiments of FIG. 2, the ramp generator 160 is coupled to the power stage 120, the off-chip components 210 and the controller 180. The ramp generator 160 is configured to generate the ramp signal $V_{RMP}$ according to the pulse width modulation signal $V_{LX}$ and the output voltage $V_O$. In FIG. 2, the ramp generator 160 includes a capacitor $C_{VIC}$ and two resistors $R_{VIC}$ and $R_{SUM}$. To be more specific, the ramp generator 160 generates a triangle wave based on the capacitor $C_{VIC}$ and the resistor $R_{VIC}$ according to the pulse width modulation signal $V_{LX}$. The ramp generator 160 further sums up of the triangle wave and the output voltage $V_O$ based on the resistor $R_{SUM}$ to generate the ramp signal $V_{RMP}$. The ramp signal $V_{RMP}$ is transmitted to the controller 180.

As shown in FIG. 1, the controller 180 is configured to generate the duty signal $S_{DUTY}$ according to the ramp signal $V_{RMP}$ from the ramp generator 160 and the compensation signal $V_{COM}$ from the feedback circuit 140. The controller 180 includes a comparator 182, a control logic circuit 184, an on-time generator 186 and an off-time generator 188.

In embodiments illustrated FIG. 2, the ramp signal $V_{RMP}$ is transmitted to a first input terminal (e.g., a positive input terminal) of the comparator 182 in the controller 180, and the compensation signal $V_{COM}$ is transmitted to a second input terminal (e.g., a negative input terminal) of the comparator 182 in the controller 180. The comparator 182 is configured to generate a comparison signal $V_{CMP}$ according to a difference between the compensation signal $V_{COM}$ and the ramp signal $V_{RMP}$. It is noticed that the disclosure is not limited to generate the comparison signal $V_{CMP}$ by comparing the compensation signal $V_{COM}$ and the ramp signal $V_{RMP}$ in the manner shown in FIG. 2.

Figure 3:
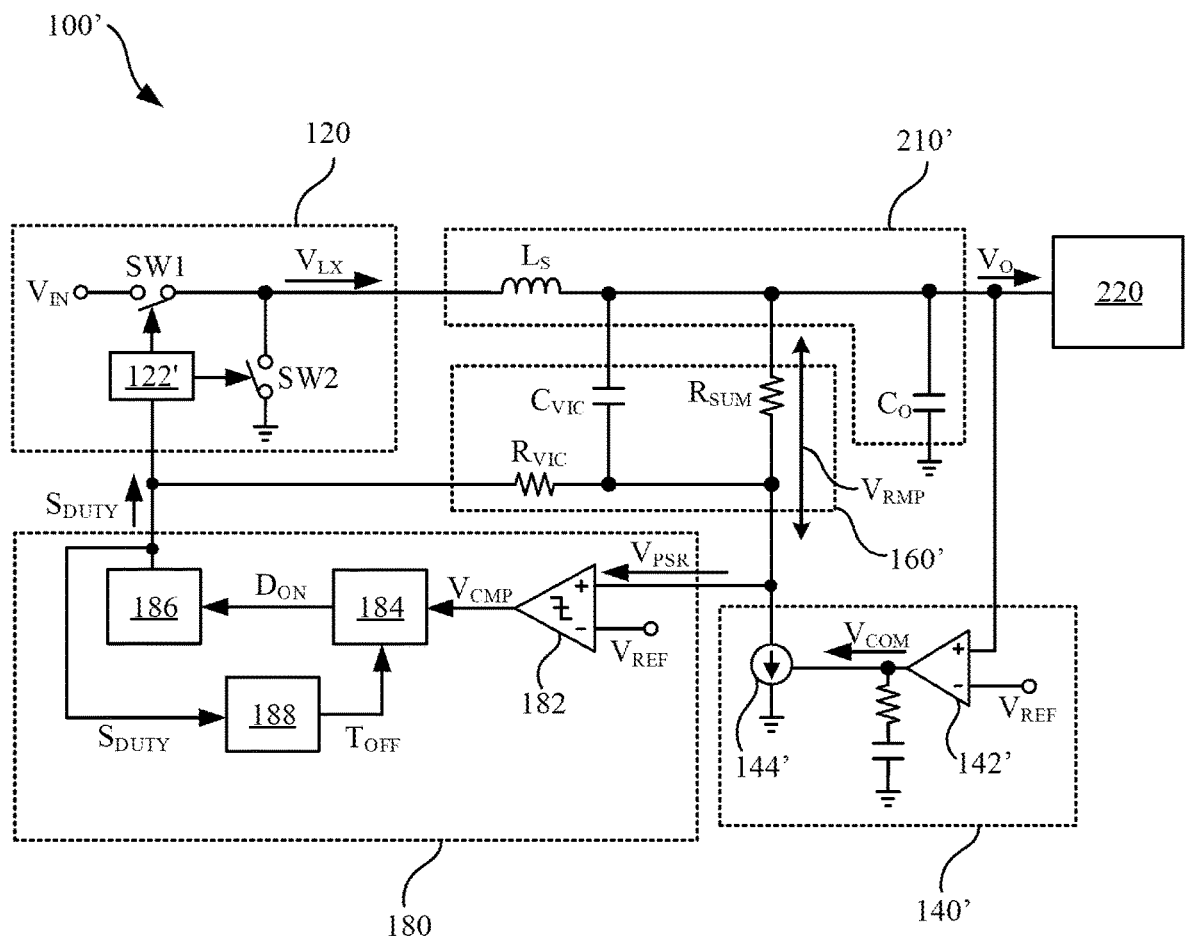
FIG. 3 is a schematic diagram illustrating alternative internal structures of a power stage, a feedback circuit, a ramp generator and a controller in the power converter according to some other embodiments.

In some other embodiments, the ramp signal $V_{RMP}$ and the compensation signal $V_{COM}$ can be summed into a composite signal which is transmitted to the controller 180 for further processing. Reference is further made to FIG. 3, which is a schematic diagram illustrating alternative internal structures of a power stage 120, a feedback circuit 140', a ramp generator 160' and a controller 180 in the power converter 100' according to some embodiments.

As shown in FIG. 3, the power converter 100' includes the power stage 120, the feedback circuit 140', the ramp generator 160' and the controller 180. Functions and behaviors of the power stage 120, the feedback circuit 140', the ramp generator 160' and the controller 180 in the power converter 100' in FIG. 3 are similar to the power stage 120, the feedback circuit 140, the ramp generator 160 and the controller 180 in the power converter 100 in FIG. 2. A difference between embodiments in FIG. 3 and in FIG. 2 is that the feedback circuit 140' and the ramp generator 160' are configured to generate the compensation signal $V_{COM}$ and a ramp signal $V_{RMP}$. In this case, the ramp signal $V_{RMP}$ and the compensation signal $V_{COM}$ are summed as a composite signal $V_{PSR}$. As shown in FIG. 3, the composite signal $V_{PSR}$ is transmitted to a first input terminal of the comparator 182 in the controller 180. A reference signal $V_{REF}$ is transmitted to a second input terminal of the comparator 182. The comparator 182 is configured to generate the comparison signal $V_{CMP}$ based on a comparison that which one of the composite signal $V_{PSR}$ and the reference signal $V_{REF}$ has a higher level.

In embodiments illustrated in FIG. 3, the power stage 120 is configured to provide a pulse width modulation signal $V_{LX}$ to off-chip components 210' (including an inductor $L_S$ and a capacitor $C_O$) for forming the output voltage $V_O$ on the off-chip components 210.

As shown in embodiments in FIG. 3, the feedback circuit 140' includes an error amplifier 142' and an amplifier 144'. The output voltage $V_O$ is transmitted to a first input terminal (e.g., a positive input terminal) of the error amplifier 142'. A second input terminal (e.g., a negative input terminal) of the error amplifier 142' receives the reference signal $V_{REF}$. The error amplifier 142' compares the output voltage $V_O$ with the reference signal $V_{REF}$ and correspondingly generates the compensation signal $V_{COM}$. The compensation signal $V_{COM}$ is transmitted to the amplifier 144' to form a direct-current (DC) bias. The DC bias can be equal to $Gm*V_{COM}$, in which Gm is a gain of the amplifier 144'. The DC bias is utilized to perform DC offset cancellation in FIG. 3.

The ramp generator 160' is coupled to the off-chip components 210', the feedback circuit 140' and the controller 180. The ramp generator 160' includes two resistors $R_{VIC}$ and $R_{SUM}$ and a capacitor $C_{VIC}$. The ramp generator 160' is configured to generate the ramp signal $V_{RMP}$ according to the output voltage $V_O$ (through the resistor $R_{SUM}$ and the capacitor $C_{VIC}$) and the duty signal $S_{DUTY}$ (through the resistor $R_{VIC}$ and the capacitor $C_{VIC}$). As shown in FIG. 3, the DC bias generated by the feedback circuit 140' and the ramp signal $V_{RMP}$ are summed together to form the composite signal $V_{PSR}$. In this case, the composite signal $V_{PSR}$ is summed as:

$$V_{PSR} = V_{RMP} + Gm*V_{COM}$$

The compensation signal $V_{COM}$ induces the DC bias, $Gm*V_{COM}$, which is utilized to cancel an offset between the output voltage $V_O$ and the reference signal $V_{REF}$. The ramp signal $V_{RMP}$ is a triangle wave, which contributes to an alternating current (AC) component and the DC component of the composite signal $V_{PSR}$.

In embodiments shown in FIG. 3, the output voltage $V_O$ and the reference signal $V_{REF}$ are directly fed (without sampling) to the feedback circuit 140', and the feedback circuit 140' calculate a DC error (i.e., the compensation signal $V_{COM}$) on the output voltage $V_O$. In this case, the compensation signal $V_{COM}$ is able to reflect a direct-feeding DC error on the output voltage $V_O$. Therefore, the composite signal $V_{PSR}$ generated based on the compensation signal $V_{COM}$ is able to reflect the direct-feeding DC error.

In other words, the feedback circuit 140' and the ramp generator 160' shown in FIG. 3 demonstrate an alternative embodiment to implement the feedback circuit 140, the ramp generator 160 shown in FIG. 1 and FIG. 2.

The comparator 182 of the controller 180 is configured to generate the comparison signal $V_{CMP}$ according to a comparison between the ramp signal $V_{RMP}$ and the compensation signal $V_{COM}$, as shown in FIG. 2, or according to a comparison between the composite signal $V_{PSR}$ (integrated from the ramp signal $V_{RMP}$ and the compensation signal $V_{COM}$) and the reference signal $V_{REF}$, as shown in FIG. 3.

As shown in FIG. 1, in the controller 180, the comparison signal $V_{CMP}$ generated by the comparator 182 is transmitted to the control logic circuit 184. The control logic circuit 184 is coupled with the comparator 182, and the control logic circuit 184 is configured to generate a first trigger signal $D_{ON}$ according to the comparison signal $V_{CMP}$ and an off-time pulse signal $T_{OFF}$ time.

The on-time generator 186 is coupled with the control logic circuit 184. The on-time generator 186 is configured to generate an on-time pulse signal and a duty signal $S_{DUTY}$ according to the first trigger signal $D_{ON}$. The duty signal $S_{DUTY}$ is transmitted to the power stage 120 for controlling a duty cycle ratio of the pulse width modulation signal $V_{LX}$. When the duty cycle ratio of the pulse width modulation signal $V_{LX}$ is higher, the output voltage $V_O$ has a higher voltage level. When the duty cycle ratio of the pulse width modulation signal $V_{LX}$ is lower, the output voltage $V_O$ has a lower voltage level.

The off-time generator 188 is configured to generate the off-time pulse signal $T_{OFF}$ according to the duty signal $S_{DUTY}$ and transmits the off-time pulse signal $T_{OFF}$ back to the control logic circuit 184.

Figure 4:
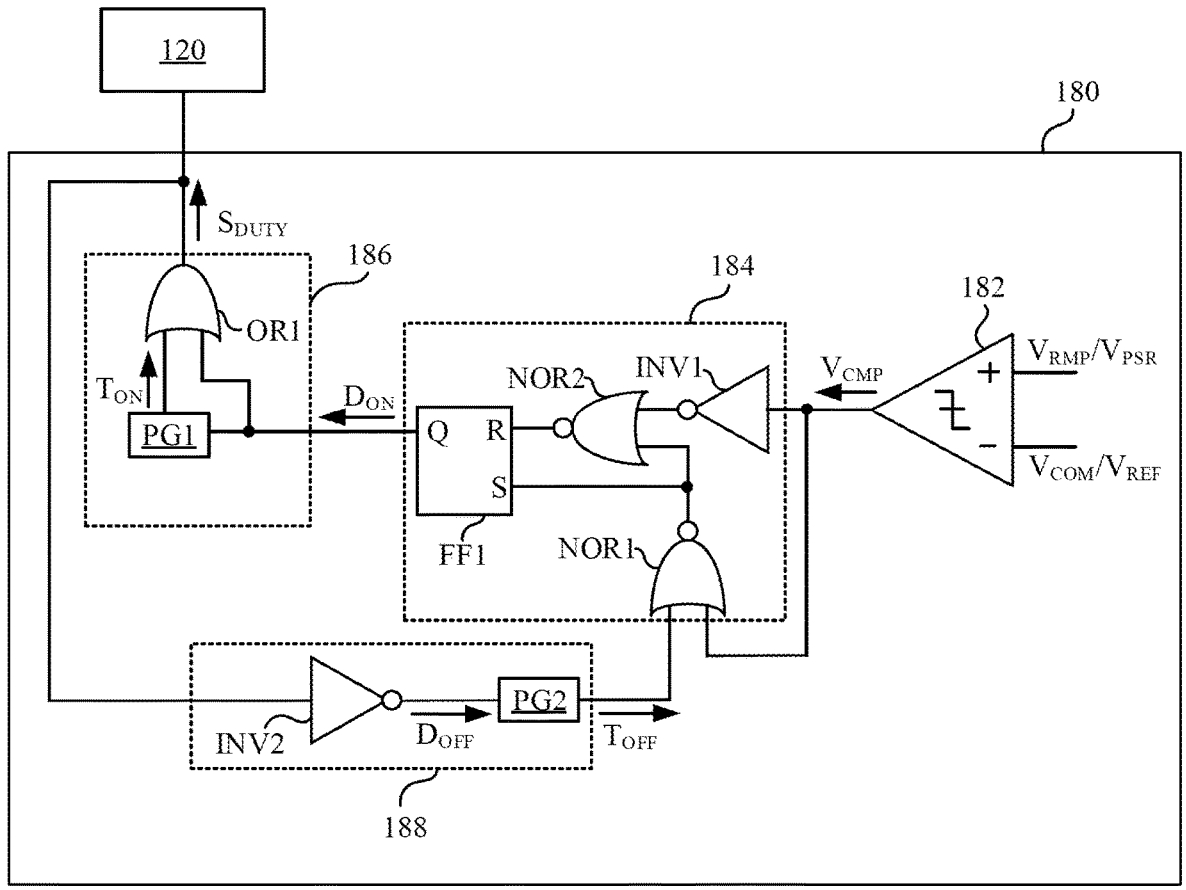
FIG. 4 is a schematic diagram illustrating internal structures of the controller according to some embodiments.

Reference is further made to FIG. 4, which is a schematic diagram illustrating internal structures of the controller 180 according to some embodiments.

As shown in FIG. 4, the control logic circuit 184 include a first inverter INV1, a first NOR gate NOR1, a second NOR gate NOR2 and a first flip-flop FF1. An input of the first inverter INV1 is configured to receive the comparison signal $V_{CMP}$ from the comparator 182. A first input of the first NOR gate NOR1 is configured to receive the comparison signal $V_{CMP}$. A second input of the first NOR gate NOR1 is configured to receive the off-time pulse signal $T_{OFF}$. A first input of the second NOR gate NOR2 is coupled to an output of the first inverter INV1. A second input of the second NOR gate NOR2 is coupled to an output of the first NOR gate NOR1. A set input (S) of the first flip-flop FF1 is coupled to the output of the first NOR gate NOR1. A reset input (R) of the first flip-flop FF1 is coupled to the output of the second NOR gate NOR2. An output of the first flip-flop FF1 is configured to generate the first trigger signal $D_{ON}$.

Logic relationships between inputs and outputs of the control logic circuit 184 is shown in following Table 1:

TABLE 1

| input | | intermediate | | output |
|---|---|---|---|---|
| $V_{CMP}$ | $T_{OFF}$ | Set | Reset | $D_{ON}$ |
| 1 | X | 0 | 1 | 0 |
| 0 | 1 | 0 | 0 | keep |
| 0 | 0 | 1 | 0 | 1 |

In some embodiments, in Table 1, "1" indicates a high level; "0" indicates a low level; "X" indicates don't-care.

As shown in FIG. 4 and Table 1, when the comparison signal $V_{CMP}$ and the off-time pulse signal $T_{OFF}$ are low, the first trigger signal $D_{ON}$ will be pulled high. When the comparison signal $V_{CMP}$ is high, the first trigger signal $D_{ON}$ will be pulled low. When the comparison signal $V_{CMP}$ is low and the off-time pulse signal $T_{OFF}$ is the high, the first trigger signal $D_{ON}$ keeps at a present level.

In some embodiments, the first trigger signal $D_{ON}$ is configured to trigger the duty signal $S_{DUTY}$ switching from a low level into a high level (on-time). In some embodiments, the off-time pulse signal $T_{OFF}$ is configured to hold the duty signal $S_{DUTY}$ at the low level for at least a minimal off-time period.

It is noticed that, the control logic circuit 184 is not limited to the embodiment (including the first inverter INV1, the first NOR gate NOR1, the second NOR gate NOR2 and the first flip-flop FF1) illustrated in FIG. 4. The logic components shown in FIG. 4 can be replaced by other arrangements with the same logic relationship. For example, in some alternative arrangements, the first NOR gate NOR1 in FIG. 4 can be replaced by a OR gate and an inverter connected in series; the second NOR gate NOR2 in FIG. 4 can be replaced by a OR gate and an inverter connected in series; the first inverter INV1 in FIG. 4 can be replaced by three inverters connected in series; or a combination of aforesaid alternative arrangements.

As shown in FIG. 4, the on-time generator 186 includes a first pulse generator PG1 and an OR gate OR1. An input of the first pulse generator PG1 is configured to receive the first trigger signal $D_{ON}$ from the control logic circuit 184. The first pulse generator is configured to generate the on-time pulse signal $T_{ON}$ according to the first trigger signal $D_{ON}$. A first input of the OR gate OR1 is configured to receive the first trigger signal $D_{ON}$ from the control logic circuit 184. A second input of the OR gate OR1 is configured to receive the on-time pulse signal $T_{ON}$ from the first pulse generator PG1. An output of the OR gate OR1 is configured to generate the duty signal $S_{DUTY}$.

Figure 5:
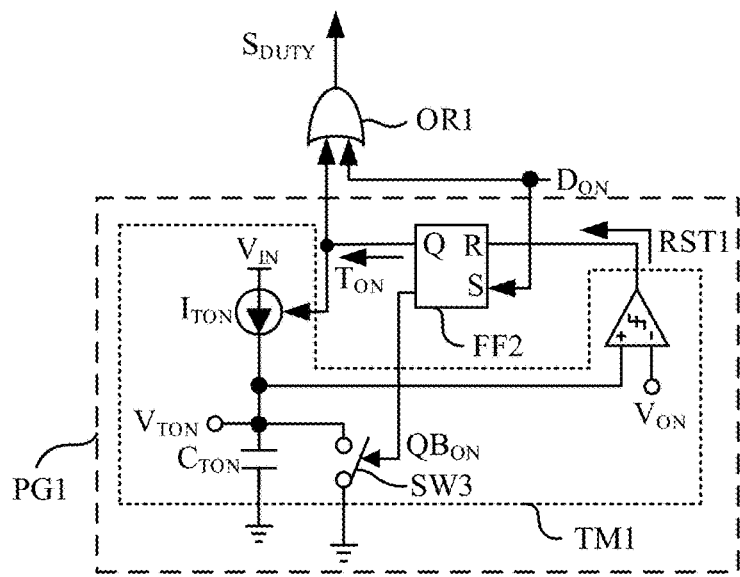
FIG. 5 is a schematic diagram illustrating internal structures of the first pulse generator in the on-time generator according to some embodiments.

In some embodiments, the on-time pulse signal $T_{ON}$ is configured to hold the duty signal $S_{DUTY}$ at the high level for at least a minimal on-time period. Reference is further made to FIG. 5, which is a schematic diagram illustrating internal structures of the first pulse generator PG1 in the on-time generator 186 according to some embodiments.

As shown in FIG. 5, in some embodiments, the first pulse generator PG1 includes a first current-charging timer TM1 and a second flip-flop FF2. A set input of the second flip-flop FF2 is configured to receive the first trigger signal $D_{ON}$. A reset input of the second flip-flop FF2 is configured to receive a first reset signal RST1 from the first current-charging timer TM1. An output of the second flip-flop FF2 is configured to generate the on-time pulse signal $T_{ON}$. The first current-charging timer TM1 is triggered by the on-time pulse signal $T_{ON}$ for generating a first reset signal RST1.

As shown in FIG. 5, when the first trigger signal $D_{ON}$ triggers the second flip-flop FF2 and the on-time pulse signal $T_{ON}$ is switched to the high level, the first current-charging timer TM1 starts charging a capacitor $C_{TON}$ with a current $I_{TON}$. While charging, a voltage level $V_{TON}$ stored on the capacitor $C_{TON}$ will increase over time. When the voltage level $V_{TON}$ exceeds a reference level $V_{ON}$, the first reset signal RST1 is generated to the reset terminal of the second flip-flop FF2, so as to pull low the on-time pulse signal $T_{ON}$. At the time that the first reset signal RST1 is generated, an inverted output signal $QB_{ON}$ generated by the second flip-flop FF2 is transmitted to a third switch SW3 in the first pulse generator PG1. In this case, the inverted output signal $QB_{ON}$ is a signal opposite to the on-time pulse signal $T_{ON}$. The third switch SW3 is turned on by the inverted output signal $QB_{ON}$, and so as to reset the voltage level $V_{TON}$ to the ground level.

In some embodiments, a rising edge of the on-time pulse signal $T_{ON}$ is triggered by a rising edge of the first trigger signal $D_{ON}$, and a falling edge of the on-time pulse signal $T_{ON}$ is decided by the first reset signal RST1. A pulse width of the on-time pulse signal $T_{ON}$ is decided by a charging time of the voltage level $V_{TON}$ in the first current-charging timer TM1.

Figure 6:
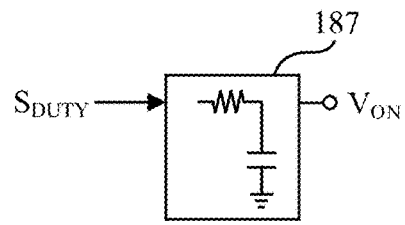
FIG. 6 is a schematic diagram illustrating a signal generator for generating the reference level according to some embodiments.

Reference is further made to FIG. 6, which is a schematic diagram illustrating a signal generator 187 for generating the reference level $V_{ON}$ according to some embodiments. As shown in FIG. 6, the reference level $V_{ON}$ utilized by the first current-charging timer TM1 in FIG. 5 can be generated by the signal generator 187 according to the duty signal $S_{DUTY}$.

As shown in FIG. 4, the off-time generator 188 includes a second inverter INV2 and a second pulse generator PG2. An input of the second inverter INV2 is configured to receive the duty signal $S_{DUTY}$. An output of the second inverter INV2 is configured to generate a second trigger signal $D_{OFF}$. An input of the second pulse generator PG2 is configured to receive the second trigger signal $D_{OFF}$ from the second inverter INV2. The second pulse generator PG2 is configured to generate the off-time pulse signal $T_{OFF}$ according to the second trigger signal $D_{OFF}$ (i.e., an inverted signal of the duty signal $S_{DUTY}$).

Figure 7:
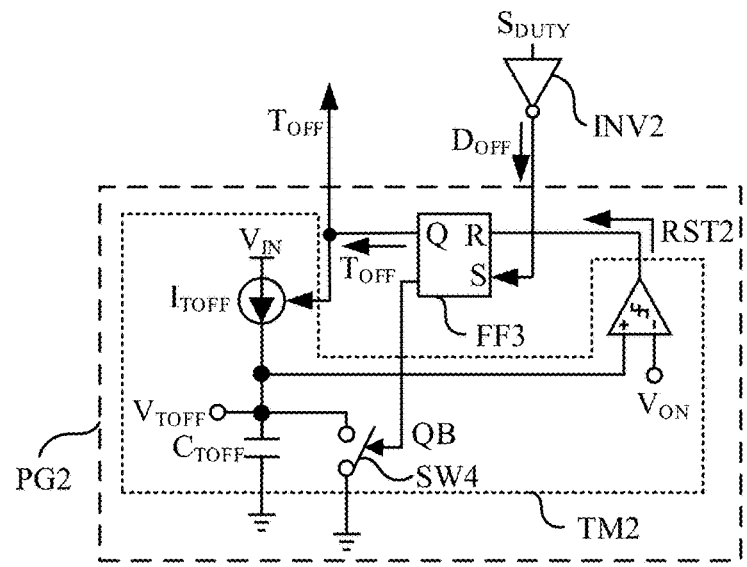
FIG. 7 is a schematic diagram illustrating internal structures of the second pulse generator in the off-time generator according to some embodiments.

Reference is further made to FIG. 7, which is a schematic diagram illustrating internal structures of the second pulse generator PG2 in the off-time generator 188 according to some embodiments.

As shown in FIG. 7, in some embodiments, the second pulse generator PG2 includes a second current-charging timer TM2 and a third flip-flop FF3. A set input of the third flip-flop FF3 is configured to receive the second trigger signal $D_{OFF}$ (i.e., an inverted signal of the duty signal $S_{DUTY}$). A reset input of the third flip-flop FF3 is configured to receive a second reset signal RST2 from the second current-charging timer TM2. An output of the third flip-flop FF3 is configured to generate the off-time pulse signal $T_{OFF}$. The second current-charging timer TM2 is triggered by the off-time pulse signal $T_{OFF}$ for generating a second reset signal RST2.

As shown in FIG. 7, when the second trigger signal $D_{OFF}$ triggers the third flip-flop FF3 and the off-time pulse signal $T_{OFF}$ is switched to the high level, the second current-charging timer TM2 starts charging a capacitor $C_{TOFF}$ with a current $I_{TOFF}$. While charging, a voltage level $V_{TOFF}$ will increase over time. When the voltage level $V_{TOFF}$ exceeds a reference level $V_{ON}$, the second reset signal RST2 is generated to the reset terminal of the third flip-flop FF3, so as to pull low the off-time pulse signal $T_{OFF}$. At the time that the second reset signal RST2 is generated, an inverted output signal QB generated by the third flip-flop FF3 is transmitted to a fourth switch SW4 in the second pulse generator PG2. In this case, the inverted output signal QB is a signal opposite to the off-time pulse signal $T_{OFF}$. The fourth switch SW4 is turned on by the inverted output signal QB, and so as to reset the voltage level $V_{TOFF}$ to the ground level.

In some embodiments, a rising edge of the off-time pulse signal $T_{OFF}$ is triggered by a falling edge of the duty signal $S_{DUTY}$, and a falling edge of the off-time pulse signal $T_{OFF}$ is decided by the second reset signal RST2. A pulse width of the off-time pulse signal $T_{OFF}$ is decided by a charging time of the voltage level $V_{TOFF}$ in the second current-charging timer TM2.

It is noticed that, as shown in FIG. 4, the off-time generator 188 generate the off-time pulse signal $T_{OFF}$ according to the duty signal $S_{DUTY}$, not according to the first trigger signal $D_{ON}$ nor the on-time pulse signal $T_{ON}$. In this case, and the off-time generator 188 is able to perform an off-time control (including timing and minimal on-time period) of the duty signal $S_{DUTY}$, separately from an on-time control (including timing and minimal on-time period) performed by the on-time generator 186. In other words, the minimal on-time period and the minimal off-time period can be modulated separately.

The duty cycle is the key factor to determine whether the power converter 100 operating in the on-time control mode or in the off-time control mode. A primary factor of the duty cycle is a conversion ratio (i.e., $V_O/V_{IN}$) between the output voltage $V_O$ and the input voltage $V_{IN}$, and the secondary factor of the duty cycle is the loading 220. Corresponding to the loading 220, in aforesaid embodiments shown in FIG. 1 to FIG. 7, when the loading 220 driven by the power converter 100 is steady at a relatively light load (e.g., the loading 220 is a battery which is almost full, or the loading 220 is a processor in a standby mode), a DC level of the ramp signal $V_{RMP}$ will be lower and the duty signal $S_{DUTY}$ will be adjusted to has a lower duty cycle ratio. In this case, under the loading 220 is steady at a relatively light load, the duty signal $S_{DUTY}$ is generated in an on-time control mode, the on-time pulse signal $T_{ON}$ generated by the first pulse generator PG1 is utilized to make sure the duty signal $S_{DUTY}$ has the minimal on-time period.

When the loading 220 driven by the power converter 100 is steady at a relatively heavy load (e.g., the loading 220 is a battery which is almost empty, or the loading 220 is a processor in a performance mode), a DC level of the ramp signal $V_{RMP}$ will be higher and the duty signal $S_{DUTY}$ will be adjusted to has a higher duty cycle ratio. In this case, under the loading 220 is steady at a relatively heavy load, the duty signal $S_{DUTY}$ is generated in an off-time control mode, the off-time pulse signal $T_{OFF}$ generated by the second pulse generator PG2 is utilized to make sure the duty signal $S_{DUTY}$ has the minimal off-time period.

When the loading 220 driven by the power converter 100 is in a transient state charging from a light load into a heavy load, a DC level of the ramp signal $V_{RMP}$ will be decreased dramatically. In this case, during the transient state, the comparison signal $V_{CMP}$ will be temporarily hold at the low level, logical "0". In this case, after the off-time pulse signal $T_{OFF}$ (i.e., the minimal off-time period) is reset to the low level, the comparison signal $V_{CMP}$ and the off-time pulse signal $T_{OFF}$ will be both set at low levels, logical "0". According to Table 1, the duty signal $S_{DUTY}$ will be temporarily hold at the high level, logical "1". In other words, an on-time of the duty signal $S_{DUTY}$ is extended in this transient state (charging from the light load into the heavy load). By extending the on-time of the duty signal $S_{DUTY}$ during this transient state, the power converter 100 is able to respond to increasing variation of the loading 220 in a shorter time with a smaller output voltage variation.

When the loading 220 driven by the power converter 100 is in another transient state charging from a heavy load into a light load, a DC level of the ramp signal $V_{RMP}$ will be increased dramatically. In this case, during the transient state, the comparison signal $V_{CMP}$ will be temporarily hold at the high level, logical "1". In this case, because the comparison signal $V_{CMP}$ is at the high level, according to Table 1, the duty signal $S_{DUTY}$ will be temporarily hold at the low level, logical "0". In other words, an off-time of the duty signal $S_{DUTY}$ is extended in this transient state (charging from the heavy load into the light load). By extending the off-time of the duty signal $S_{DUTY}$ during this transient state, the power converter 100 is able to respond to decreasing variation of the loading 220 in a shorter time with a smaller output voltage variation.

In the embodiments shown in FIG. 1 to FIG. 4, the controller 180 includes the on-time generator 186 and the off-time generator 188 separately. The disclosure is not limited to implement the on-time generator 186 and the off-time generator 188 separately as shown in FIG. 1 to FIG. 4. In some other embodiments, the on-time generator 186 and the off-time generator 188 can be combined together and implemented as one combined time generator. In this case, some components in the on-time generator 186 and the off-time generator 188 can be shared in the combined time generator, and it can reduce a circuit area and a manufacturing cost of the combined time generator.

Figure 8:
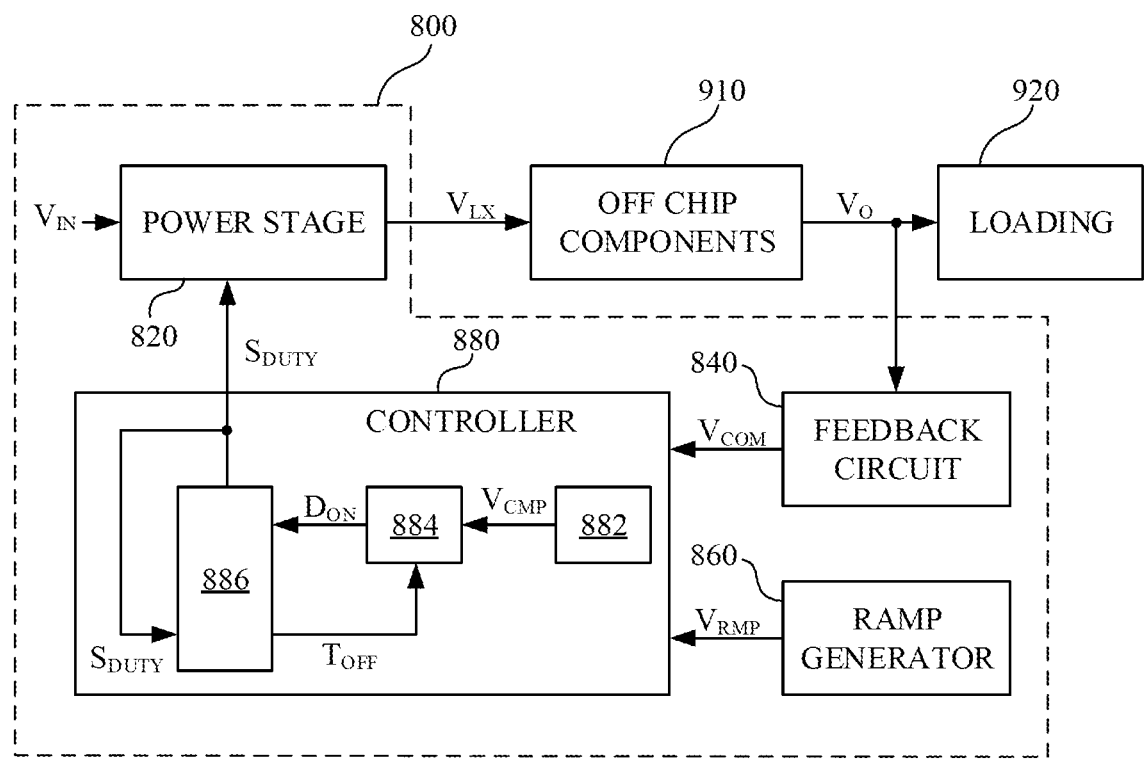
FIG. 8 is a schematic diagram illustrating a power converter according to some embodiments of the present disclosure.

Reference is further made to FIG. 8. FIG. 8 is a schematic diagram illustrating a power converter 800 according to some embodiments of the present disclosure. As illustrated in FIG. 8, the power converter 800 includes a power stage 820, a feedback circuit 840, a ramp generator 860 and a controller 880. The power stage 820 is coupled to the controller 880 and some off-chip components 910. The power stage 820 is configured to generate a pulse width modulation signal $V_{LX}$ according to an input voltage $V_{IN}$ and a duty signal $S_{DUTY}$. The pulse width modulation signal $V_{LX}$ is provided by the power stage 820 to the off-chip components 910 for forming an output voltage $V_O$ on the off-chip components 910. The output voltage $V_O$ is transmitted to a loading 920 for driving the loading 920. In some embodiments, the loading 920 can be a battery, a processor or any equivalent power consuming load.

Functions and behaviors of the power stage 820, the feedback circuit 840 and the ramp generator 860 in the power converter 800 in FIG. 8 are similar to the power stage 120, the feedback circuit 140 and the ramp generator 160 in the power converter 100 as discussed in aforesaid embodiments shown in FIG. 1 to FIG. 7. Therefore, details about the power stage 820, the feedback circuit 840 and the ramp generator 860 are not repeated here again, and can be referred to aforesaid embodiments about the power stage 120, the feedback circuit 140 and the ramp generator 160.

Compared to embodiments shown in FIG. 1 to FIG. 7, a difference of the power converter 800 in FIG. 8 is that the controller 880 includes a comparator 882, a control logic circuit 884 and a combined time generator 886. The combined time generator 886 shown in FIG. 8 is a combination of the on-time generator 186 and the off-time generator 188 of aforesaid embodiments shown in FIG. 1 to FIG. 7.

Figure 9:
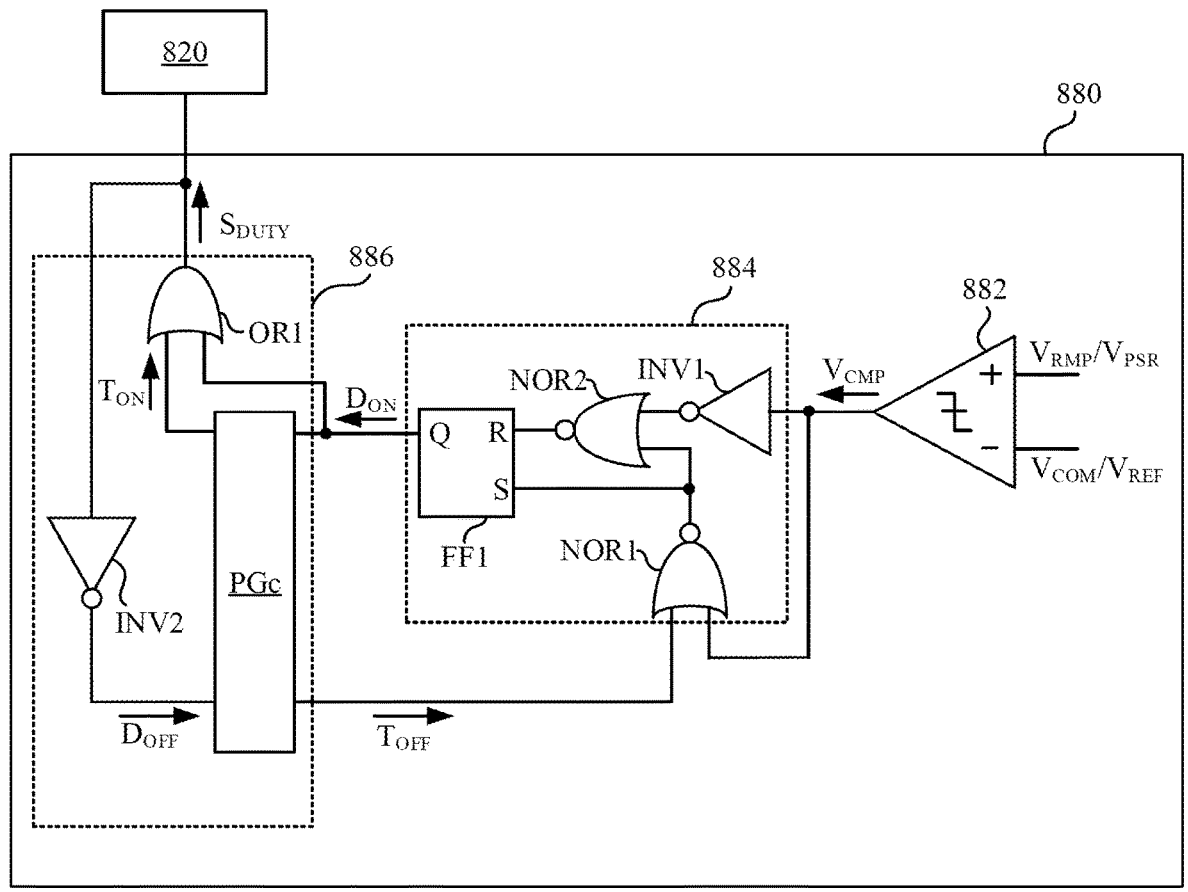
FIG. 9 is a schematic diagram illustrating internal structures of the controller according to some embodiments.

Reference is further made to FIG. 9, which is a schematic diagram illustrating internal structures of the controller 880 according to some embodiments. The comparator 882 is configured to generate a comparison signal $V_{CMP}$ according to the compensation signal $V_{COM}$ and the ramp signal $V_{RMP}$ (or according to the composite signal $V_{PSR}$ and the reference signal $V_{REF}$ as shown in FIG. 3 alternatively). The control logic circuit 884 is coupled with the comparator 882. The control logic circuit 884 is configured to generate a first trigger signal $D_{ON}$ according to the comparison signal $V_{CMP}$ and an off-time pulse signal $T_{OFF}$.

As shown in FIG. 9, the control logic circuit 884 includes a first inverter INV1, a first NOR gate NOR1, a second NOR gate NOR2 and a first flip-flop FF1. An input of the first inverter INV1 is configured to receive the comparison signal $V_{CMP}$ from the comparator 882. A first input of the first NOR gate NOR1 is configured to receive the comparison signal $V_{CMP}$. A second input of the first NOR gate NOR1 is configured to receive the off-time pulse signal $T_{OFF}$. A first input of the second NOR gate NOR2 is coupled to an output of the first inverter INV1. A second input of the second NOR gate NOR2 is coupled to an output of the first NOR gate NOR1. A set input of the first flip-flop FF1 is coupled to the output of the first NOR gate NOR1. A reset input of the first flip-flop FF1 is coupled to the output of the second NOR gate NOR2. An output of the first flip-flop FF1 is configured to generate the first trigger signal $D_{ON}$.

Functions and behaviors of the comparator 882 and the control logic circuit 884 in the controller 880 in FIG. 8 and FIG. 9 are similar to the comparator 182 and the control logic circuit 184 in the controller 180 as discussed in aforesaid embodiments shown in FIG. 1 to FIG. 7.

The combined time generator 886 is coupled with the control logic circuit 884 and the power stage 820. The combined time generator 886 is configured to generate a duty signal according to the first trigger signal $D_{ON}$ and generate the off-time pulse signal $T_{OFF}$ according to the duty signal $S_{DUTY}$. The duty signal $S_{DUTY}$ generated by the combined time generator 886 is transmitted to the power stage 820 for controlling a duty cycle ratio of the pulse width modulation signal $V_{LX}$. The off-time pulse signal $T_{OFF}$ generated by the combined time generator 886 is transmitted back to the control logic circuit 884.

As shown in FIG. 9, the combined time generator 886 includes an OR gate OR1, a second inverter INV2 and a pulse generator PGc. A first input of the OR gate OR1 is configured to receive the first trigger signal $D_{ON}$ from the control logic circuit 884. A second input of the OR gate OR1 is configured to receive an on-time pulse signal $T_{ON}$ generated by the pulse generator PGc. An output of the OR gate OR1 is configured to generate the duty signal $S_{DUTY}$. An input of the second inverter INV2 is coupled to the output of the OR gate OR1 and configured to receive the duty signal $S_{DUTY}$. An output of the second inverter INV2 is configured to generate a second trigger signal $D_{OFF}$ according to the duty signal $S_{DUTY}$. The pulse generator PGc is configured to generate the on-time pulse signal $T_{ON}$ according to the first trigger signal $D_{ON}$, and generate the off-time pulse signal $T_{OFF}$ according to the second trigger signal $D_{OFF}$. The off-time pulse signal $T_{OFF}$ is transmitted back to the control logic circuit 884.

Figure 10:
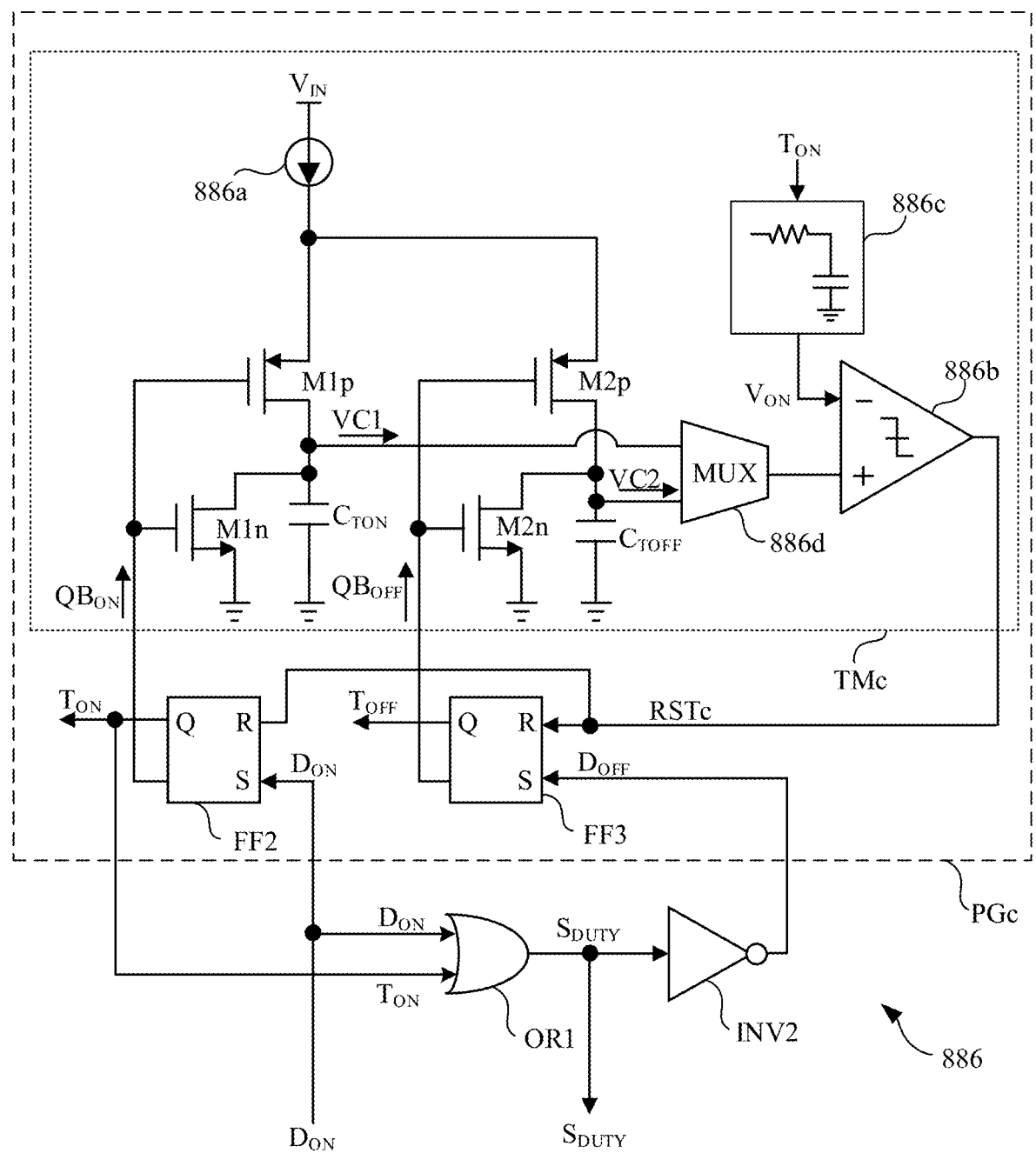
FIG. 10 is a schematic diagram illustrating internal structures of the pulse generator and related components of the combined time generator in FIG. 9 according to some embodiments.

Reference is further made to FIG. 10, which is a schematic diagram illustrating internal structures of the pulse generator PGc and related components (i.e., the OR gate OR1 and the second inverter INV2) of the combined time generator 886 in FIG. 9 according to some embodiments.

As shown in FIG. 10, the pulse generator PGc in the combined time generator 886 includes a combined current-charging timer TMc, a second flip-flop FF2 and a third flip-flop FF3. The combined current-charging timer TMc is triggered by at least one of the first trigger signal $D_{ON}$ and the second trigger signal $D_{OFF}$ for generating a reset signal RSTc.

As shown in FIG. 10, a set input of the second flip-flop FF2 is configured to receive the first trigger signal $D_{ON}$ generated by the control logic circuit 884 in FIG. 9. A reset input of the second flip-flop FF2 is configured to receive the reset signal RSTc from the combined current-charging timer TMc. An output of the second flip-flop FF2 is configured to generate the on-time pulse signal $T_{ON}$. Another output of the second flip-flop FF2 is configured to generate an inverted output signal $QB_{ON}$, which is a signal opposite to the on-time pulse signal $T_{ON}$.

As shown in FIG. 10, a set input of the third flip-flop FF3 is configured to receive the second trigger signal $D_{OFF}$ generated by the second inverter INV2. A reset input of the third flip-flop FF3 is configured to receive the reset signal RSTc from the combined current-charging timer TMc. An output of the third flip-flop FF3 is configured to generate the off-time pulse signal $T_{OFF}$. Another output of the third flip-flop FF3 is configured to generate an inverted output signal $QB_{OFF}$, which is a signal opposite to the off-time pulse signal $T_{OFF}$.

Functions and behaviors of the second flip-flop FF2 and the third flip-flop FF3 in FIG. 10 are similar to the second flip-flop FF2 in FIG. 5 and the third flip-flop FF3 in FIG. 7. Compared with the embodiments in FIG. 5 and FIG. 7, reset inputs of the second flip-flop FF2 and the third flip-flop FF3 in FIG. 10 shares the same signal (i.e., the reset signal RSTc from the combined current-charging timer TMc).

As shown in FIG. 10, when the first trigger signal $D_{ON}$ triggers the second flip-flop FF2 and the on-time pulse signal $T_{ON}$ is switched to the high level, the inverted output signal $QB_{ON}$ is switched to the low level, so as to turn on a switch M1p. In this case, a charging current from a current source 886a starts charging a capacitor $C_{TON}$. While charging, a voltage level VC1 stored on the capacitor $C_{TON}$ will increase over time. The voltage level VC1 passes through a multiplexer 886d to an input of a comparator 886b. The comparator 886b is configured to compare the voltage level VC1 with a reference level $V_{ON}$. When the voltage level VC1 exceeds the reference level $V_{ON}$, the reset signal RSTc is generated to the reset terminal of the second flip-flop FF2, so as to pull low the on-time pulse signal $T_{ON}$. At the time that the reset signal RSTc is generated, the inverted output signal $QB_{ON}$ generated by the second flip-flop FF2 is pulled high, to turn off the switch M1p and turn on another switch M1n. The switch M1n turned on by the inverted output signal $QB_{ON}$ will reset the voltage level VC1 to the ground level. As shown in FIG. 10, the reference level $V_{ON}$ can be generated by a signal generator 886c according to the on-time pulse signal $T_{ON}$.

In some embodiments, a rising edge of the on-time pulse signal $T_{ON}$ is triggered by a rising edge of the first trigger signal $D_{ON}$, and a falling edge of the on-time pulse signal $T_{ON}$ is decided by the reset signal RSTc. A pulse width of the on-time pulse signal $T_{ON}$ is decided by a charging time of the voltage level VC1 in the combined current-charging timer TMc.

Similarly, when the second trigger signal $D_{OFF}$ triggers the third flip-flop FF3 and the off-time pulse signal $T_{OFF}$ is switched to the high level, the inverted output signal $QB_{OFF}$ is switched to the low level, so as to turn on a switch M2p. In this case, a charging current from a current source 886a starts charging a capacitor $C_{TOFF}$. While charging, a voltage level VC2 stored on the capacitor $C_{TOFF}$ will increase over time. The voltage level VC2 passes through a multiplexer 886d to the input of the comparator 886b. The comparator 886b is configured to compare the voltage level VC2 with a reference level $V_{ON}$. When the voltage level VC2 exceeds the reference level $V_{ON}$, the reset signal RSTc is generated to the reset terminal of the third flip-flop FF3, so as to pull low the off-time pulse signal $T_{OFF}$. At the time that the reset signal RSTc is generated, the inverted output signal $QB_{OFF}$ generated by the third flip-flop FF3 is pulled high, to turn off the switch M2p and turn on another switch M2n. The switch M2n turned on by the inverted output signal $QB_{OFF}$ will reset the voltage level VC2 to the ground level.

As discussed above, the pulse generator PGc with the combined current-charging timer TMc shown in FIG. 10 is able to fulfill the functions of the first pulse generator PG1 in FIG. 5 and the second pulse generator PG2 in FIG. 7. In the embodiments shown in FIG. 10, the current source 886a and the comparator 886b in the combined current-charging timer TMc can be shared to perform on-time control and off-time control. It is not required to implement two separated current sources and two separated comparators for performing on-time control and off-time control. Therefore, structures of the combined time generator 886 in FIG. 8 to FIG. 10 can reduce a circuit area and a manufacturing cost of the combined time generator 886 and the power converter 800.

Based on the descriptions above, the present disclosure can realize the seamless transition with a fast transition and without the aforementioned additional switching circuit to reduce the circuit cost and the circuit size.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter, comprising:
    a power stage, configured to generate a pulse width modulation signal for forming an output voltage to a loading;
    a feedback circuit, configured to generate a compensation signal according to the output voltage;
    a ramp generator, configured to generate a ramp signal;
    a controller, coupled with the feedback circuit and the ramp generator, the controller comprising:
        a comparator, configured to generate a comparison signal by comparing the compensation signal and the ramp signal;
        a control logic circuit, coupled with the comparator, and configured to generate a first trigger signal according to the comparison signal and an off-time pulse signal;
        an on-time generator, coupled with the control logic circuit, and configured to generate an on-time pulse signal and a duty signal according to the first trigger signal, wherein the duty signal is transmitted to the power stage for controlling a duty cycle ratio of the pulse width modulation signal; and
        an off-time generator, configured to generate the off-time pulse signal according to the duty signal and transmit the off-time pulse signal to the control logic circuit.

2. The power converter of claim 1, wherein the power stage is configured to providing the pulse width modulation signal to off-chip components for forming the output voltage on the off-chip components, the ramp generator is coupled to the feedback circuit, the off-chip components and the controller, the ramp generator is configured to generate the ramp signal according to the output voltage and the duty signal.

3. The power converter of claim 2, wherein the ramp signal and the compensation signal are summed as a composite signal, the composite signal is transmitted to a first input terminal of the comparator in the controller, a reference signal is transmitted to a second input terminal of the comparator, the comparison signal is generated by the comparator according to a comparison between the composite signal and the reference signal.

4. The power converter of claim 1, wherein the power stage is configured to providing the pulse width modulation signal to off-chip components for forming the output voltage on the off-chip components, the ramp generator is coupled to the power stage, the off-chip components and the controller, the ramp generator is configured to generate the ramp signal according to the output voltage and the pulse width modulation signal.

5. The power converter of claim 4, wherein the ramp signal is transmitted to a first input terminal of the comparator in the controller, the compensation signal is transmitted to a second input terminal of the comparator in the controller.

6. The power converter of claim 1, wherein the control logic circuit comprises:
    a first inverter, an input of the first inverter being configured to receive the comparison signal from the comparator;
    a first NOR gate, a first input of the first NOR gate being configured to receive the comparison signal, a second input of the first NOR gate being configured to receive the off-time pulse signal;
    a second NOR gate, a first input of the second NOR gate being coupled to an output of the first inverter, a second input of the second NOR gate being coupled to an output of the first NOR gate; and
    a first flip-flop, a set input of the first flip-flop being coupled to the output of the first NOR gate, a reset input of the first flip-flop being coupled to the output of the second NOR gate, an output of the first flip-flop being configured to generate the first trigger signal.

7. The power converter of claim 1, wherein the on-time generator comprises:
    a first pulse generator, an input of the first pulse generator being configured to receive the first trigger signal from the control logic circuit, the first pulse generator being configured to generate the on-time pulse signal according to the first trigger signal; and
    an OR gate, a first input of the OR gate being configured to receive the first trigger signal from the control logic circuit, a second input of the OR gate being configured to receive the on-time pulse signal from the first pulse generator, an output of the OR gate being configured to generate the duty signal.

8. The power converter of claim 7, wherein the first pulse generator of the on-time generator comprises:
    a first current-charging timer, triggered by the on-time pulse signal for generating a first reset signal; and
    a second flip-flop, a set input of the second flip-flop being configured to receive the first trigger signal, a reset input of the second flip-flop being configured to receive the first reset signal from the first current-charging timer, an output of the second flip-flop being configured to generate the on-time pulse signal.

9. The power converter of claim 1, wherein the off-time generator comprises:
    a second inverter, an input of the second inverter being configured to receive the duty signal, an output of the second inverter being configured to generate a second trigger signal; and
    a second pulse generator, an input of the second pulse generator being configured to receive the second trigger signal from the second inverter, the second pulse generator being configured to generate the off-time pulse signal according to the second trigger signal.

10. The power converter of claim 9, wherein the second pulse generator of the off-time generator comprises:
    a second current-charging timer, triggered by the off-time pulse signal for generating a second reset signal; and
    a third flip-flop, a set input of the third flip-flop being configured to receive the second trigger signal, a reset input of the third flip-flop being configured to receive the second reset signal from the second current-charging timer, an output of the third flip-flop being configured to generate the off-time pulse signal.

11. A power converter, comprising:
    a power stage, configured to generate a pulse width modulation signal for forming an output voltage to a loading;
    a feedback circuit, configured to generate a compensation signal according to the output voltage;
    a ramp generator, configured to generate a ramp signal; and
    a controller, coupled with the feedback circuit and the ramp generator, the controller comprising:

a comparator, configured to generate a comparison signal by comparing the compensation signal and the ramp signal;

a control logic circuit, coupled with the comparator, and configured to generate a first trigger signal according to the comparison signal and an off-time pulse signal; and a combined time generator, coupled with the control logic circuit, wherein the combined time generator is configured to generate a duty signal according to the first trigger signal and generate the off-time pulse signal according to the duty signal, wherein the duty signal generated by the combined time generator is transmitted to the power stage for controlling a duty cycle ratio of the pulse width modulation signal, and the off-time pulse signal generated by the combined time generator is transmitted to the control logic circuit.

12. The power converter of claim 11, wherein the power stage is configured to providing the pulse width modulation signal to off-chip components for forming the output voltage on the off-chip components, the ramp generator is coupled to the off-chip components, the feedback circuit and the controller, the ramp generator is configured to generate the ramp signal according to the output voltage and the duty signal.

13. The power converter of claim 12, wherein the ramp signal and the compensation signal are summed as a composite signal, the composite signal is transmitted to a first input terminal of the comparator in the controller, a reference signal is transmitted to a second input terminal of the comparator, the comparison signal is generated by the comparator according to a comparison between the composite signal and the reference signal.

14. The power converter of claim 11, wherein the power stage is configured to providing the pulse width modulation signal to off-chip components for forming the output voltage on the off-chip components, the ramp generator is coupled to the power stage, the off-chip components and the controller, the ramp generator is configured to generate the ramp signal according to the output voltage and the pulse width modulation signal.

15. The power converter of claim 14, wherein the ramp signal is transmitted to a first input terminal of the comparator in the controller, the compensation signal is transmitted to a second input terminal of the comparator in the controller.

16. The power converter of claim 11, wherein the control logic circuit comprises:

a first inverter, an input of the first inverter being configured to receive the comparison signal from the comparator;

a first NOR gate, a first input of the first NOR gate being configured to receive the comparison signal, a second input of the first NOR gate being configured to receive the off-time pulse signal;

a second NOR gate, a first input of the second NOR gate being coupled to an output of the first inverter, a second input of the second NOR gate being coupled to an output of the first NOR gate; and a first flip-flop, a set input of the first flip-flop being coupled to the output of the first NOR gate, a reset input of the first flip-flop being coupled to the output of the second NOR gate, an output of the first flip-flop being configured to generate the first trigger signal.

17. The power converter of claim 11, wherein the combined time generator comprises:

an OR gate, a first input of the OR gate being configured to receive the first trigger signal from the control logic circuit, a second input of the OR gate being configured to receive an on-time pulse signal, an output of the OR gate being configured to generate the duty signal;

a second inverter, an input of the second inverter being coupled to the output of the OR gate, an output of the second inverter being configured to generate a second trigger signal; and a pulse generator, the pulse generator being configured to generate the on-time pulse signal according to the first trigger signal, and generate the off-time pulse signal according to the second trigger signal, wherein the off-time pulse signal is transmitted to the control logic circuit.

18. The power converter of claim 17, wherein the pulse generator comprises:

a combined current-charging timer, triggered by one of the first trigger signal and the second trigger signal for generating a reset signal;

a second flip-flop, a set input of the second flip-flop being configured to receive the first trigger signal, a reset input of the second flip-flop being configured to receive the reset signal from the combined current-charging timer, an output of the second flip-flop being configured to generate the on-time pulse signal; and a third flip-flop, a set input of the third flip-flop being configured to receive the second trigger signal, a reset input of the third flip-flop being configured to receive the reset signal from the combined current-charging timer, an output of the third flip-flop being configured to generate the off-time pulse signal.

* * * * *